(12) United States Patent
Jin et al.

(10) Patent No.: US 11,714,637 B1
(45) Date of Patent: Aug. 1, 2023

(54) USER SUPPORT CONTENT GENERATION

(71) Applicant: International Business Machines Corporation, Armonk, NY (US)

(72) Inventors: Yuan Jin, Shanghai (CN); Rong Zhao, Beijing (CN); Jing Zhang, Shanghai (CN); Li Li Guan, Beijing (CN); Zhe Yan, Beijing (CN); Ke Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/651,848

(22) Filed: Feb. 21, 2022

(51) Int. Cl.
 *G06F 8/73* (2018.01)
(52) U.S. Cl.
 CPC ..................... *G06F 8/73* (2013.01)
(58) Field of Classification Search
 CPC .................... G06F 8/73; G06F 8/70
 See application file for complete search history.

(56) References Cited

U.S. PATENT DOCUMENTS

| | | | |
|---|---|---|---|
| 9,229,800 B2 | 1/2016 | Jain | |
| 9,548,886 B2 | 1/2017 | Gates | |
| 10,176,239 B2 | 1/2019 | Rubinger | |
| 2008/0155422 A1* | 6/2008 | Manico | G11B 27/031 707/999.102 |
| 2016/0173486 A1 | 6/2016 | Abbott | |
| 2017/0011308 A1 | 1/2017 | Sun | |
| 2018/0067903 A1* | 3/2018 | Maker | G06F 40/106 |
| 2019/0158366 A1 | 5/2019 | Higgins | |
| 2019/0297031 A1* | 9/2019 | Basheer | G06N 3/006 |
| 2022/0208188 A1* | 6/2022 | Yoffe | G06T 7/0006 |

FOREIGN PATENT DOCUMENTS

| | | |
|---|---|---|
| CN | 108924029 B | 11/2018 |
| CN | 110457578 A | 11/2019 |
| WO | 2021142771 A1 | 7/2021 |

OTHER PUBLICATIONS

Zhang, "StackGAN: Text to Photo-realistic Image Synthesis with Stacked Generative Adversarial Networks", 2017, Proceedings of the IEEE International Conference on Computer Vision (ICCV), pp. 5907-5915 (Year: 2017).*

Reed, "Generative Adversarial Text to Image Synthesis", 2016, Proceedings of The 33rd International Conference on Machine Learning, PMLR 48:1060-1069 (Year: 2016).*

(Continued)

*Primary Examiner* — Wei Y Zhen
*Assistant Examiner* — Amir Soltanzadeh
(74) *Attorney, Agent, or Firm* — James L. Olsen

(57) ABSTRACT

Aspects of the present disclosure relate to support content generation. An issue description is received from a user. A software feature associated with the issue description is identified using a trained classification model. A base image associated with the software feature is obtained. The base image is modified to add information indicated in the issue description, wherein the modified base image is generated support content. The generated support content is transmitted.

19 Claims, 10 Drawing Sheets

(56) References Cited

OTHER PUBLICATIONS

Cooley et al., "Privacy-preserving screen capture: towards closing the loop for health IT usability", Journal of Biomedical Informatics 46 (2013) 721-733, <https://www.sciencedirect.com/science/article/pii/S1532046413000737 >.
Cooley, Joseph A., "Screen capture for sensitive systems", Dartmouth College Dartmouth Digital Commons, Master's Theses,<https://digitalcommons.dartmouth.edu/cgi/viewcontent.cgi?article=1016&context=masters_theses >, May 1, 2011, 129 pages.
Mell et al., "The NIST Definition of Cloud Computing", National Institute of Standards and Technology, Special Publication 800-145, Sep. 2011, 7 pages.

\* cited by examiner

USER SUPPORT CONTENT GENERATION

BACKGROUND

The present disclosure relates generally to the field of computing, and in particular, to generating support content to aid in resolving user information technology (IT) and software issues.

Help desk software enables enterprises to track user help requests and resolve user issues. For example, if a user has an information technology (IT) related issue, the user can initiate a request for help. The request for help may be assigned an identification (e.g., a ticket number/routing) such that an appropriate entity (e.g., customer service personnel) can aid the user in resolving their issue.

SUMMARY

Embodiments of the present disclosure are directed to a method, system, and computer program product for support content generation. An issue description can be received from a user. A software feature associated with the issue description can be identified using a trained classification model. A base image associated with the software feature can be obtained. The base image can be modified to add information indicated in the issue description, wherein the modified base image is generated support content. The generated support content can be transmitted.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
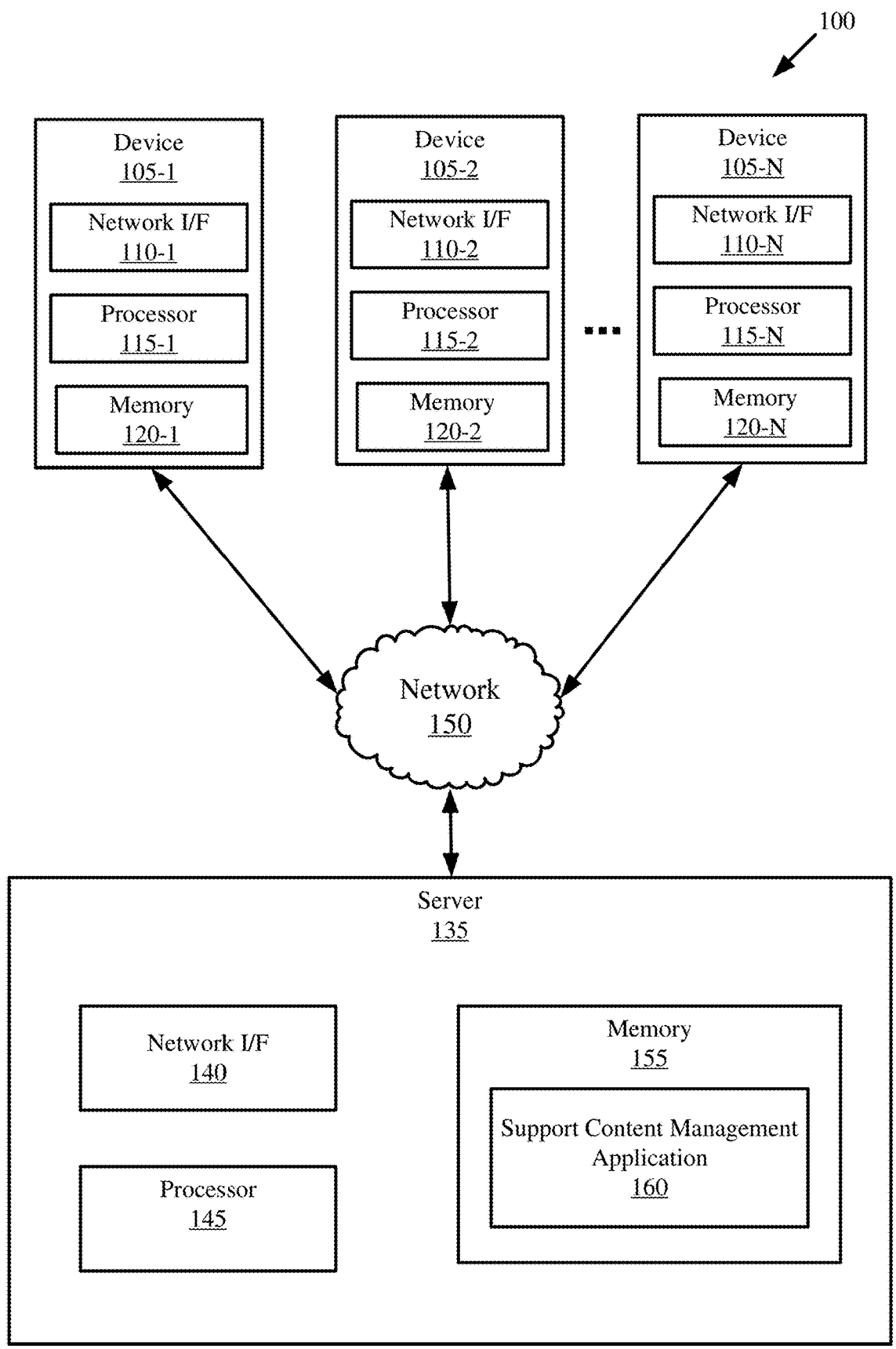
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to computing, and in particular, to generating support content to aid in resolving user information technology (IT) and software issues. While the present disclosure is not necessarily limited to such applications, various aspects of the disclosure can be appreciated through a discussion of various examples using this context.

Help desk software enables enterprises to track user help requests and resolve user issues. For example, if a user has a software or information technology (IT) related issue, the user can initiate a request for help via help desk software. The request for help may be assigned an identification (e.g., a ticket number/routing) such that an appropriate entity (e.g., customer service personnel) can aid the user in resolving their issue.

Within a help desk software environment, a user may desire to transmit a screenshot or video of their issue such that associated customer service personnel can readily understand and address the user's issue. However, there are instances in which it is undesirable for a user to share a screenshot detailing the issue to an individual responsible for addressing the issue. For example, in some instances, a screenshot may include confidential information which should not be shared with the individual responsible for addressing the issue. Further, in some instances, useful information for addressing the issue may not be captured by a screenshot. Improvements are needed in help desk environments in which users can fully capture their issue without sharing sensitive data.

Aspects of the present disclosure relate to support content generation. An issue description can be received from a user. A software feature associated with the issue description can be identified using a trained classification model. A base image associated with the software feature can be obtained. The base image can be modified to add information indicated in the issue description, wherein the modified base image is generated support content. The generated support content can then be transmitted (e.g., to support personnel for a support evaluation).

Aspects of the present disclosure do not require users to transmit screenshots of software interfaces that help describe technical issues they are having to support personnel. Advantageously, by avoiding the provision of screenshots (which may include confidential information), users may prevent the disclosure of the confidential information. Further, in some instances, a screenshot may not accurately capture information that can accurately, meaningfully, and/or usefully convey to support personnel the issue the user is experiencing. Rather, aspects of the present disclosure utilize the described issue from the user to generate support content capturing the described issue for submission to a support team. In this way, aspects of the present disclosure can preserve privacy of the user while simultaneously allowing the user to capture their issue. Further, due to the various machine learning models which may be trained and utilized within aspects of the present disclosure, computing efficiency and prediction accuracy can be enhanced, as less time may be required for generating support content over time as more training data is ingested, and the generated support content may be more accurate as more training data is ingested. Further still, accurate and useful information can be added to generated support content using the user's issue description based on specific locations identified within base image(s) related to software features associated with the user's issue description. This can allow the user's issue to be more quickly and accurately addressed, as the support content generated for the user is tailored based on the user's description.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardware connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 9.

The server 135 includes a support content management application 160. The support content management application 160 can be configured to generate support content (e.g., images, graphics interchange format (GIF) content, videos, etc.) which can aid a user in resolving their information technology (IT) and/or software issues which may be submitted to a support team (e.g., help desk personnel).

The support content management application 160 can be configured to receive an issue description from a user. The issue description can be received in any suitable format, such as via text (e.g., email, messaging, a text issue submission channel), voice (e.g., over the phone or via a recording), images (e.g., images capturing the issue containing non-sensitive information), and the like. The issue description can then be pre-processed (e.g., converted from speech to text, normalized, processed via natural language processing (NLP) techniques such as keyword extraction, etc.) for analysis by the support content management application 160. The issue description may pertain to a particular software product or aspects of a software product. As referenced herein, identifying the particular software product, versions of the software product, or aspects (e.g., windows, graphical user interfaces, functional features, etc.) of software products that may relate to the issue are referenced as product "features." Thus, identifying relevant features associated with the user's issue description relates to identifying one or more software products, versions, and/or aspects thereof that may be relevant to the user's issue description.

Thereafter, the issue description can be analyzed (e.g., using a machine learning classification model) such that one or more appropriate product features can be identified. In embodiments, a feature classification model can be trained based on historical issue descriptions and associated feature identification mappings such that features associated with new issue descriptions can be identified.

Upon identifying features associated with the issue description, one or more base image(s) can be selected. Base image(s) refer to images associated with the relevant product feature which can be used as a template for generating support content. In embodiments, base images can be mock user interfaces (e.g., an emulated/generated/redacted interface corresponding to an identified feature). Thus, the selected base image(s) associated with the one or more features can serve as a template for adding useful information associated with the user's particular issue description. In embodiments, base images can be generated based on screen shots of particular product features, which may be modified (e.g., have details removed, such as confidential information and/or information specific to a user but not relevant to their issue) such that they can serve as base image templates for support content generation.

Upon identifying one or more relevant base image(s) associated with the user's issue description, element types, areas, and values (e.g., textual or numerical information) of the base image(s) can be identified. Element types, areas, and values relate to relevant information within the base image(s). For example, element types can include "labels," "inputs," and "interactable features" (e.g., switches, buttons, etc.) of a base image. Areas associated with element types can include coordinates (e.g., pixel coordinates within the image) encompassing the element types. Element values refer to the value of the specific element type. The element types and areas within the base image(s) corresponding to the issue description can be identified. The base image(s) can then be modified based on the issue description such that useful information (e.g., issue symptoms or operation steps described within the issue description) associated with the issue description can be appended to the base image(s). This can aid a support team in addressing the user's issue without including sensitive information associated with the user.

Machine learning (ML) and artificial intelligence (AI) techniques can be used by the support content generation application 160 to identify features associated with an issue description, to detect/identify element types, element areas, and element values within base image(s), and to generate useful information to be appended to the base image(s) for generating supporting content. ML and AI algorithms that can be used by the support content generation application 160 include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to the support content generation application 160 (e.g., issue description data, base image(s), etc.) can be analyzed or utilized as training data using any of the aforementioned machine learning algorithms.

More specifically, the ML and AI algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other ML and AI techniques.

Though this disclosure pertains to the collection of personal data (e.g., user issue descriptions), it is noted that in embodiments, users opt-in to the system (e.g., the support content management application 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
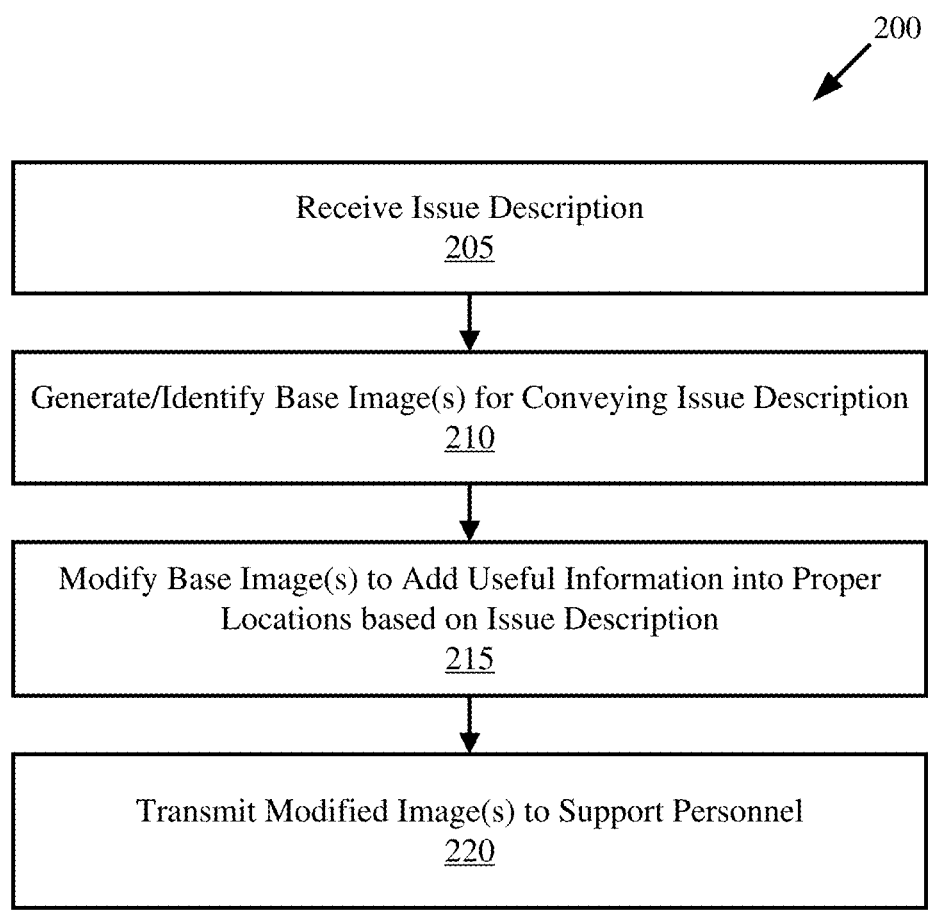
FIG. 2 is a flow-diagram illustrating an example method for support content generation, in accordance with embodiments of the present disclosure.

Referring now to FIG. 2, shown is a flow-diagram illustrating an example method 200 for generating support content based on an issue description received from a user, in accordance with embodiments of the present disclosure. One or more operations of method 200 can be completed by one or more computing devices (e.g., devices 105 or server 135).

Method 200 initiates at operation 205, where an issue description is received from a user. The issue description can be received in any suitable manner, such as via text (e.g., via a help desk software request, in an instant messaging environment, via email, etc.), voice (e.g., over the phone or a web-based application), and/or images. The issue description may detail the specific issues a user is having with one or more software features. For example, the issue description may detail an issue with an integrated development environment (IDE), an email client, a design application (e.g., chemical design software, process design software, etc.), a word processing application, a spreadsheet application, or any other suitable type of software. In embodiments, the issue may be directed to only a portion (e.g., a feature such as a specific window, specific user interface, specific operation, specific functional feature, etc.) of the software.

Base image(s) associated with the issue description can then be generated and/or identified. This is illustrated at operation 210. In embodiments, a classification model can be configured to identify software features associated with the issue description based on an analysis (e.g., extracted keywords obtained via natural language processing) of the issue description. Thereafter, pre-generated base image(s) associated with the identified features can be identified/selected. Alternatively, in embodiments, base image(s) can be generated based on the issue description. For example, one or more screenshots or mock user interfaces can be captured and processed (e.g., redacted, modified, and prepared for use as base image templates) based on the identified features associated with the user description.

The base image(s) are then modified to add useful information into proper locations based on the issue description. This is illustrated at operation 215. Modifying the base image(s) to add useful information can include identifying element types, areas, and values within the base image(s). Thereafter, the issue description can be used to modify the base image based on information included in the issue description. For example, reference to one or more element types and/or values within the issue description can be used to modify the base image in areas associated with the element types and/or values to capture the user issue description.

The modified image(s) (e.g., generated support content) are then transmitted to support personnel. This is illustrated at operation 220. The generated support content can be transmitted to support personnel in any suitable manner, such as via a software application (e.g., help desk software), via an instant messaging environment, or email.

The aforementioned operations can be completed in any order and are not limited to those described. Additionally, some, all, or none of the aforementioned operations can be completed, while still remaining within the spirit and scope of the present disclosure.

Figure 3:
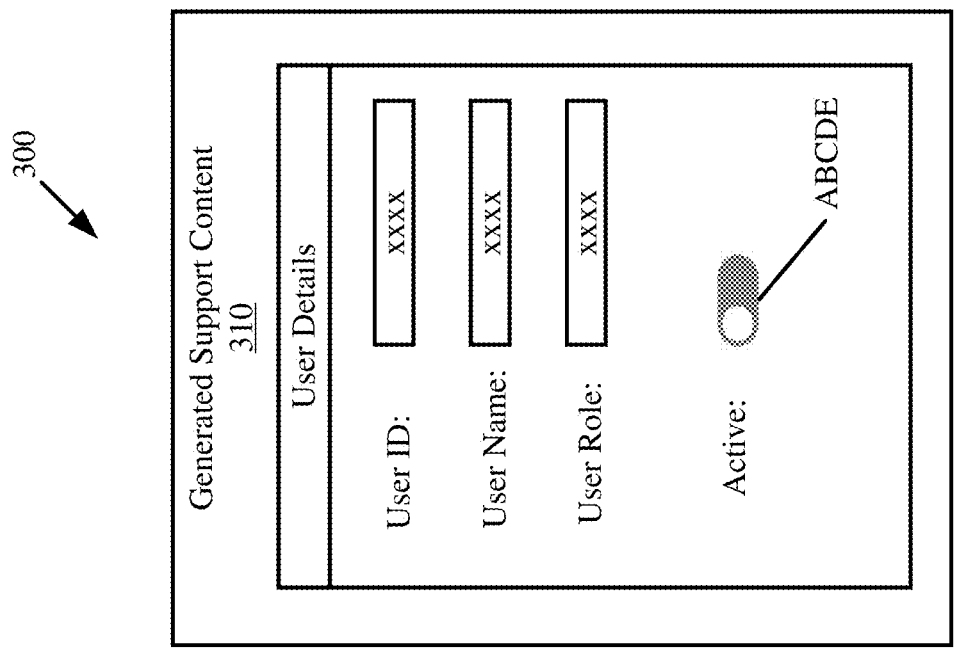
FIG. 3 is a high level diagram illustrating support content generation based on a received issue description, in accordance with embodiments of the present disclosure.
Figure 3:
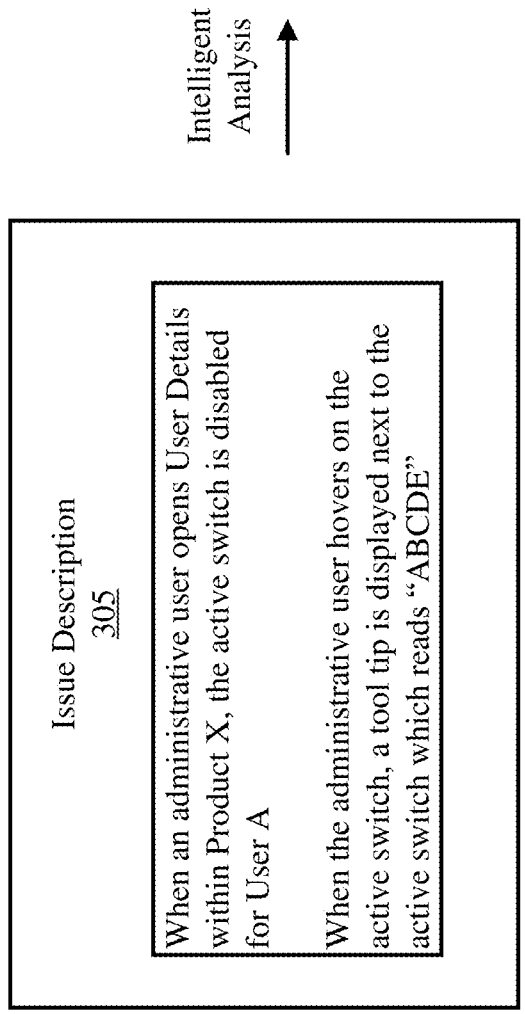

Referring now to FIG. 3, shown is a high-level diagram 300 depicting an issue description 305 and generated support content 310 based on the issue description 305, in accordance with embodiments of the present disclosure. The example depicted in FIG. 3 may be referenced through FIGS. 4-7. As depicted in FIG. 3, the issue description relates to a "User Details" software feature of "Product X." In particular, a particular element (e.g., a switch) of the User Details feature is disabled for the user. When an administrative user hovers (e.g., with a mouse pointer) over the active switch, a specific tool tip "ABCDE" is displayed next to the active switch.

As shown in FIG. 3, the User Details feature of Product X may contain sensitive information (e.g., a user identification (ID), a user name, and a user role) if transmitted to the support team. Thus, advantageously, the generated support content 310 based on the issue description 305 does not contain any sensitive information. The generated support content 310 of FIG. 3 can be generated in the manners described with respect to FIGS. 1-2 and FIGS. 4-7. In the example provided in FIG. 3, a tool tip is added to the associated base image which reads "ABCDE" next to the active switch. The generated support content 310 can then be transmitted to a support team such that they can attempt to address the user's issue.

Figure 4:
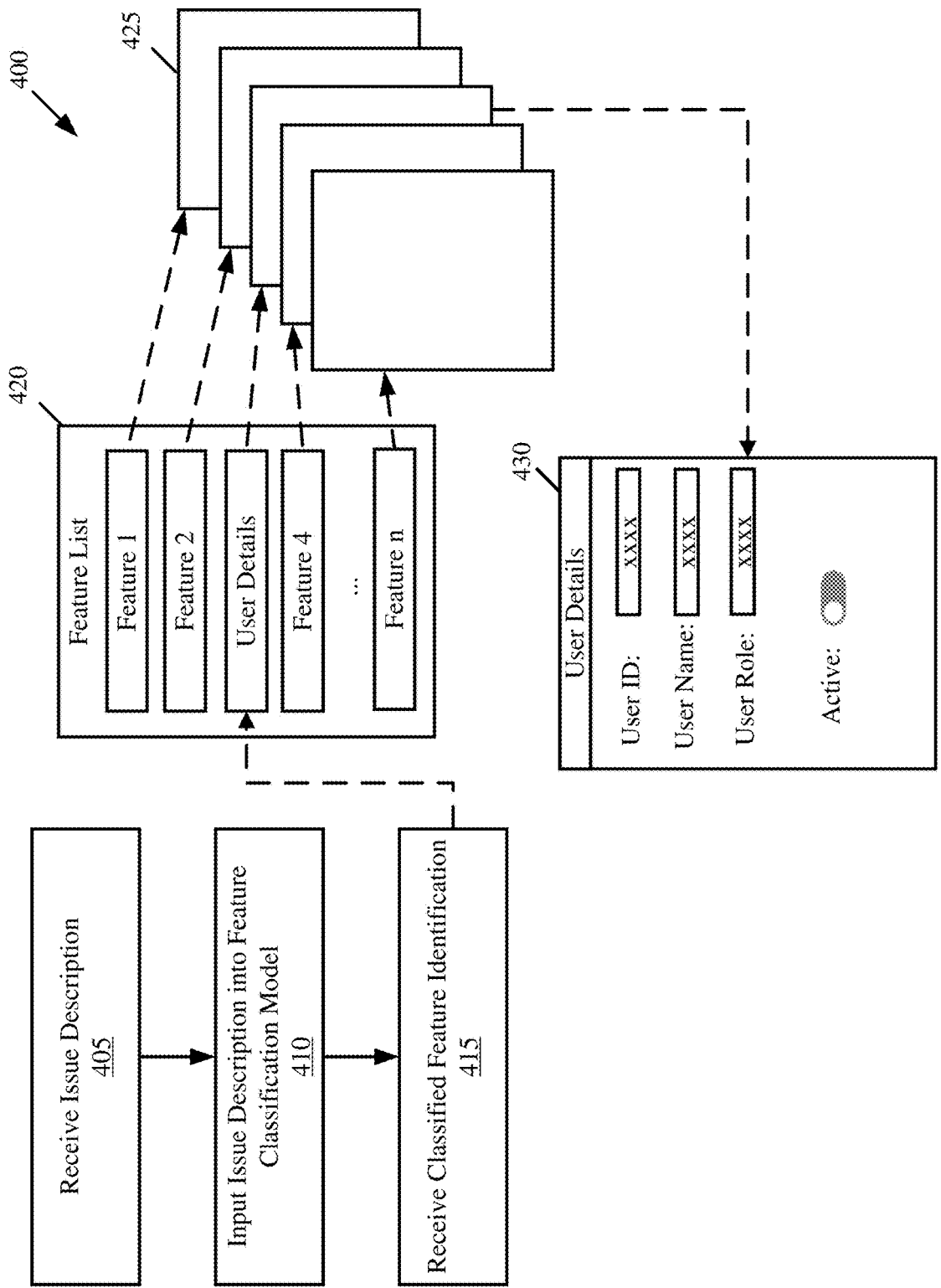
FIG. 4 is a diagram illustrating a process flow for identifying a base image based on an issue description, in accordance with embodiments of the present disclosure.

Referring now to FIG. 4, shown is a diagram 400 illustrating a process flow for selecting a base image based on a classified feature identification, in accordance with embodiments of the present disclosure.

The diagram 400 initiates at operation 405, where an issue description is received. The issue description can be the same as, or substantially similar to, the issue descriptions described with respect to FIGS. 1-2. One or more operations of diagram 400 can be completed by one or more computing devices (e.g., devices 105 or server 135).

The issue description is then input into a feature classification model. This is illustrated at operation 410. In embodiments, the issue description is pre-processed prior to ingestion into the feature classification model. For example, the issue description can be converted from speech to text, processed using natural language processing techniques (e.g., tokenization, entity extraction, keyword extraction, semantic relationship discovery, etc.), and thereafter input into the feature classification model.

The feature classification model is a machine learning model configured to receive the issue description and classify one or more software features associated with the issue description. In embodiments, the feature classification model can be a text based machine learning model, such as TextCNN (e.g., a text-based convolutional neural network), TextRNN (e.g., a text-based recurrent neural network), bidirectional encoder representation from transformer (BERT), or other such models. Training data input into such models for future feature classification is shown and described with respect to FIGS. 5A-5B. Ultimately, the feature classification model identifies one or more software features (e.g., software products, versions, and/or aspects thereof) which are relevant to the issue description.

A classified feature identification is then received. This is illustrated at operation 415. As shown in FIG. 4, a "User Details" feature of a software product is identified within a feature list 420 by the feature classification model. The feature list can have a plurality of features associated with software. Each feature can correspond to a software product, a software product version, or an aspect of a software product (e.g., a specific user interface, functional feature, window, path, etc. of a software product). Any number of features can be stored such that a feature identification machine learning model can properly classify issue descriptions as being associated with such features.

Base images 425 are mapped to specific features within the feature list 420. As shown in FIG. 4, each feature is mapped to a single base image. However, in embodiments, multiple base images may be mapped to a single feature, or multiple features may be mapped to a single base image. As shown in FIG. 4, the User Details base image 430 is identified and selected based on the identification of the user details feature by the classification model.

Figures 5A, 5B:
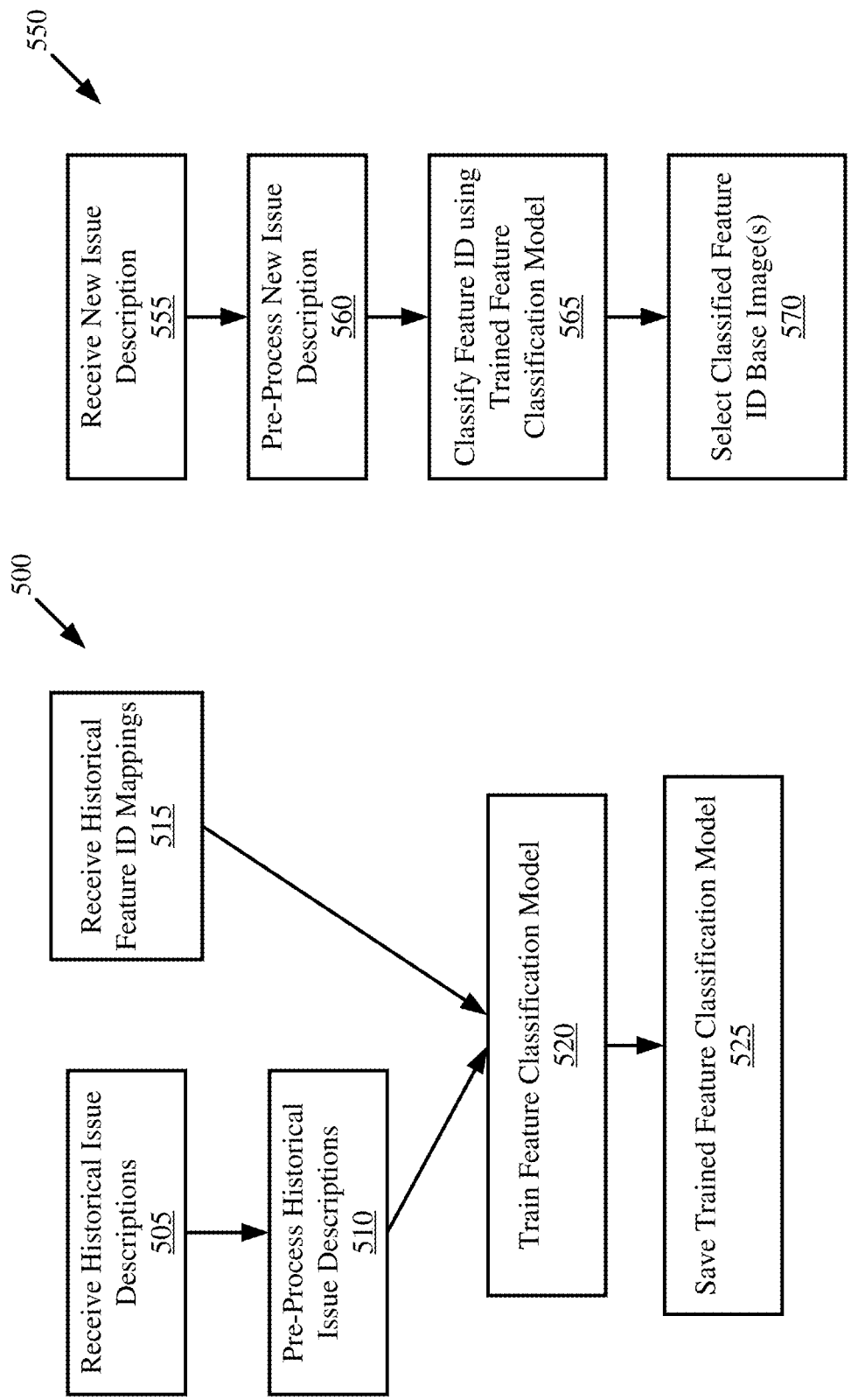
FIG. 5A is a flow-diagram illustrating an example method for training a feature classification model, in accordance with embodiments of the present disclosure.
FIG. 5B is a flow-diagram illustrating an example method for using a trained feature model to classify a feature identification based on a newly received issue description, in accordance with embodiments of the present disclosure.

Referring now to FIG. 5A, shown is a flow-diagram illustrating an example method 500 for training a feature classification model, in accordance with embodiments of the present disclosure. One or more operations of method 500 can be completed by one or more computing devices (e.g., devices 105 or server 135).

Method 500 begins at operations 505, where historical issue descriptions are received. The historical issue descriptions can be pre-processed using various techniques. This is illustrated at operation 510. For example, where historical issue descriptions are in an audio format, speech within the audio recordings can be converted to text (e.g., via speech-to-text processing). As another example, where historical issue descriptions are in image format, objects can be identified within the images (e.g., using an object detection algorithm such as a region-based convolutional neural network) and text can be extracted based on the identified objects. In embodiments, natural language processing (NLP) techniques can be performed on the text within historical issue descriptions. These techniques include, among other techniques, lemmatization, segmentation, part of speech (POS) tagging, stemming, named entity recognition (NER), terminology extraction (e.g., keyword identification), sentiment analysis, relationship extraction, and semantic parsing.

Historical feature identification (ID) mappings are also received. This is illustrated at operation 515. Feature identification mappings refer to mappings of software features to particular issue descriptions. Thus, each historical issue description received at operation 505 has a corresponding matching historical feature mapping. The historical feature ID mappings can be determined by an earlier version (e.g., iteration) of a feature classification model and/or via manual labeling (e.g., supervised labeling).

The feature classification model is then trained based on the historical issue descriptions and the historical feature ID mappings as inputs. This is illustrated at operation 520. The feature classification model is then saved. This is illustrated at operation 525. The saved trained feature classification model can then be used to predict future feature identification mappings based on newly received issue descriptions.

The aforementioned operations can be completed in any order and are not limited to those described. Additionally, some, all, or none of the aforementioned operations can be completed, while still remaining within the spirit and scope of the present disclosure.

Referring now to FIG. 5B, shown is a flow-diagram illustrating an example method 550 for classifying a feature identification of a newly received issue description, in accordance with embodiments of the present disclosure. One or more operations of method 550 can be completed by one or more computing devices (e.g., devices 105 or server 135).

Method 550 initiates at operation 555, where a new issue description is received. The new issue description is then pre-processed, which can be completed the same as, or substantially similar to, as described with respect to FIGS. 1-5A. This is illustrated at operation 560. Thereafter, a feature identification corresponding to the issue description is classified via the trained feature classification model (e.g., the model saved at operation 525 of FIG. 5A). This is illustrated at operation 565. One or more base image(s) associated with the classified feature identification are then selected. This is illustrated at operation 570.

The aforementioned operations can be completed in any order and are not limited to those described. Additionally, some, all, or none of the aforementioned operations can be completed, while still remaining within the spirit and scope of the present disclosure.

Figure 6:
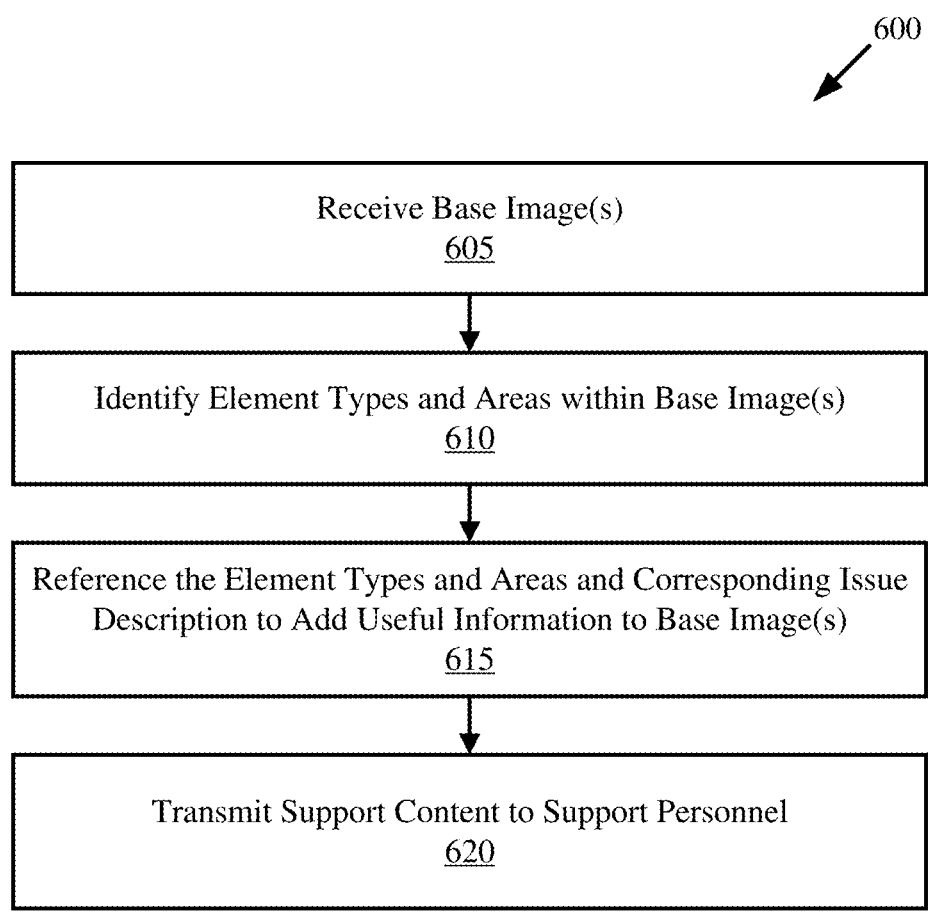
FIG. 6 is a flow-diagram illustrating an example method for modifying a base image to generate support content, in accordance with embodiments of the present disclosure.

Referring now to FIG. 6, shown is a flow-diagram illustrating an example method 600 for modifying one or more base images based on an analyzed issue description, in accordance with embodiments of the present disclosure. One or more operations of method 600 can be completed by one or more computing devices (e.g., devices 105 or server 135).

Method 600 initiates at operation 605, where one or more base image(s) are received. The base images can be the same as, or substantially similar to, the base images described with respect to FIGS. 1-5B (e.g., the base image(s) selected at operation 570 of method 550).

Element types and areas within the base image(s) are identified. This is illustrated at operation 610. In embodiments, identifying element types and areas within base image(s) can be completed using one or more machine learning models. For example, an image based object detection model such as a region-based convolutional neural network (R-CNN), You Only Look Once (YOLO), Single Shot Multibox Detector (SSD), Retina-Net, Viola-Jones Object Detection, scale-invariant feature transform (SIFT), and/or histogram of oriented gradients (HOG) can be applied to the base image(s) to identify element types and/or areas within the base image(s). The output can include each element type and corresponding location identified in the base image(s), which may be stored in a tabular format (e.g., see table 760 of FIG. 7). In embodiments, element values within base images can also be identified at operation 610. For example, optical character recognition (OCR) can be applied to the base image(s) to ascertain values of particular element types in particular element areas.

The element types and areas are then referenced with respect to the corresponding issue description to add useful information into the base image(s). This is illustrated at operation 615. In embodiments, extracted keywords and relationships based on an NLP analysis of the issue description can be used to add useful information into the base image(s) in appropriate locations. For example, following the example shown in FIG. 3, a location relationship "next to" between keywords "tool tip" and "active switch" can be determined based on the issue description. Thus, the content of the tool tip "ABCDE" can be appended next to the active switch. In embodiments, the location (e.g., coordinates) of the element types can be used to add useful information to the base image based on information described in the issue description, to be discussed further with reference to FIG. 7.

Upon modification of the base image(s), the support content (e.g., base images modified to include helpful information relevant to the user's issue description) is then transmitted to support personnel. This is illustrated at operation 620.

The aforementioned operations can be completed in any order and are not limited to those described. Additionally, some, all, or none of the aforementioned operations can be completed, while still remaining within the spirit and scope of the present disclosure.

Figure 7:
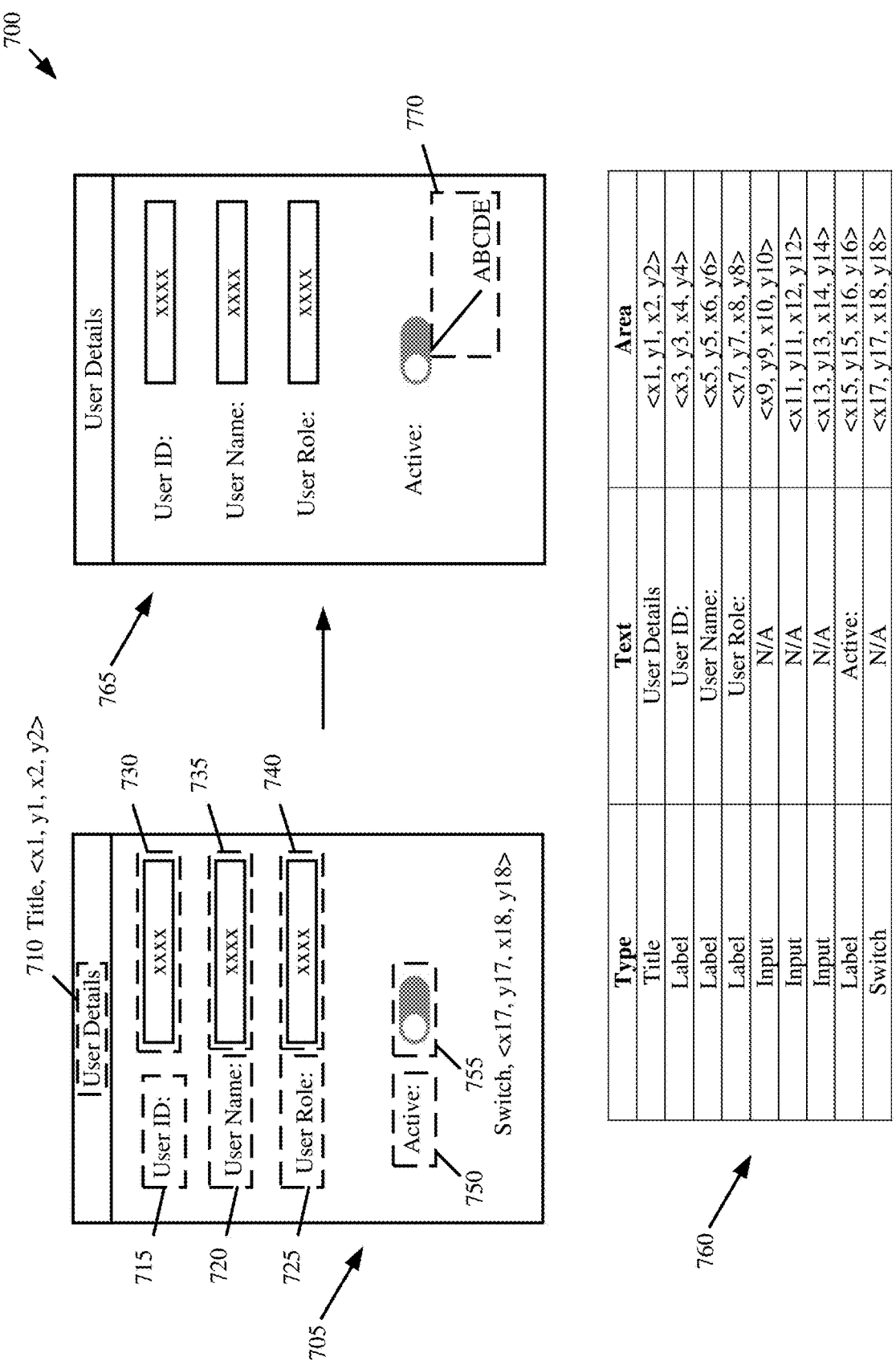
FIG. 7 is a diagram illustrating the generation of support content based on element types, element areas, and element values identified from a base image, in accordance with embodiments of the present disclosure.

Referring now to FIG. 7, shown is a diagram 700 illustrating the modification of a base image based on identified element types, areas, and values, in accordance with embodiments of the present disclosure.

As shown in FIG. 7, base image 705 is analyzed (e.g., via object detection and/or OCR) to generate table 760 including all identified element types, element text (e.g., element values), and corresponding element areas. For example, User Details 710 is determined to be an element type "title" in area "<x1, y1, x2, y2>." User ID: 715 is determined to be element type "label" in area "<x3, y3, x4, y4>. User Name: 720 is determined to be element type "label" in area "<x5, y5, x6, y6>". Similar identifications are completed for User Role: 725, input 730, input 735, input 740, Active: 750, and switch 755. All mappings for element types, values, and areas are depicted in table 760.

The base image 705 is then modified to generate support content 765 based on the location of switch 755, <x17, y17, x18, y18>. For example, NLP relationships (e.g., the relationship "next to" between the tool tip "ABCDE" and the active switch) can be used to append the tool tip "ABCDE" 770 next to the switch 755 based on the location <x17, y17, x18, y18>. In some embodiments, the issue description can be input into an image generation machine learning model, such as generative adversarial what-where network (GAWWN), StackGAN, AlignDraw, etc. such that the textual issue description can be converted into an image. Thereafter, the generated image can be merged into the base image based on the location associated with switch 755, <x17, y17, x18, y18>. However, any suitable manner for modifying the base image to include symptoms/operation steps included in the issue description can be completed without departing from the spirit and scope of the present disclosure.

In some embodiments, if element types, values, and/or locations cannot be ascertained by a model run on the base image, the user can be prompted to provide one or more element types or values which could not be ascertained by the model. For example, if a value of input 730 cannot be identified via OCR, the user can be prompted to provide a value for input 730 (e.g., "What is the value of input 730?").

Figure 8:
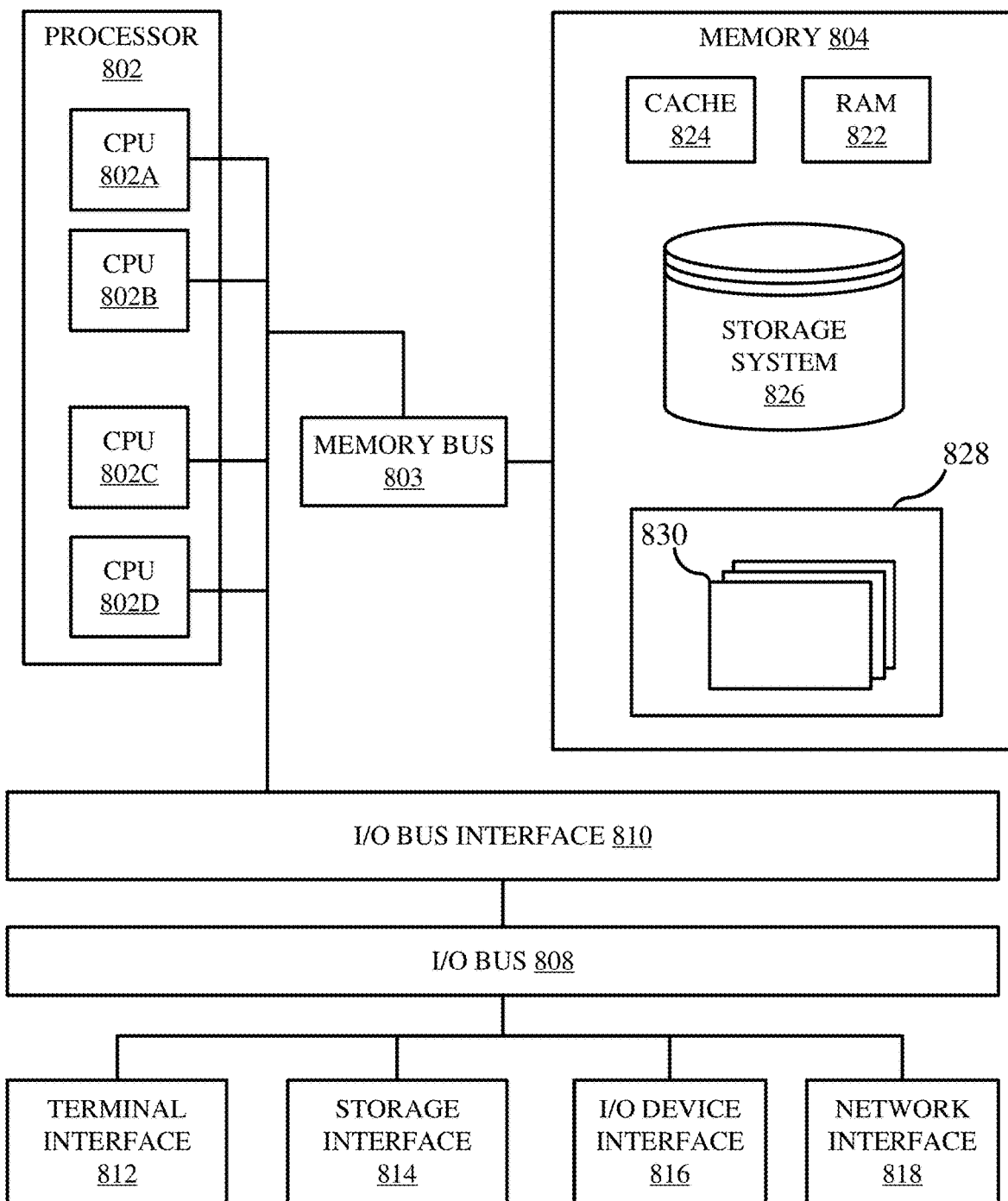
FIG. 8 is a high-level block diagram illustrating an example computer system that can be used in implementing one or more of the methods, tools, modules, and any related functions described herein, in accordance with embodiments of the present disclosure.

Referring now to FIG. 8, shown is a high-level block diagram of an example computer system 801 that may possibly be utilized in various devices discussed herein (e.g., devices 105, server 135) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802 (also referred to as processors herein), a memory 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

Memory 804 may include computer system readable media in the form of volatile memory, such as random-access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
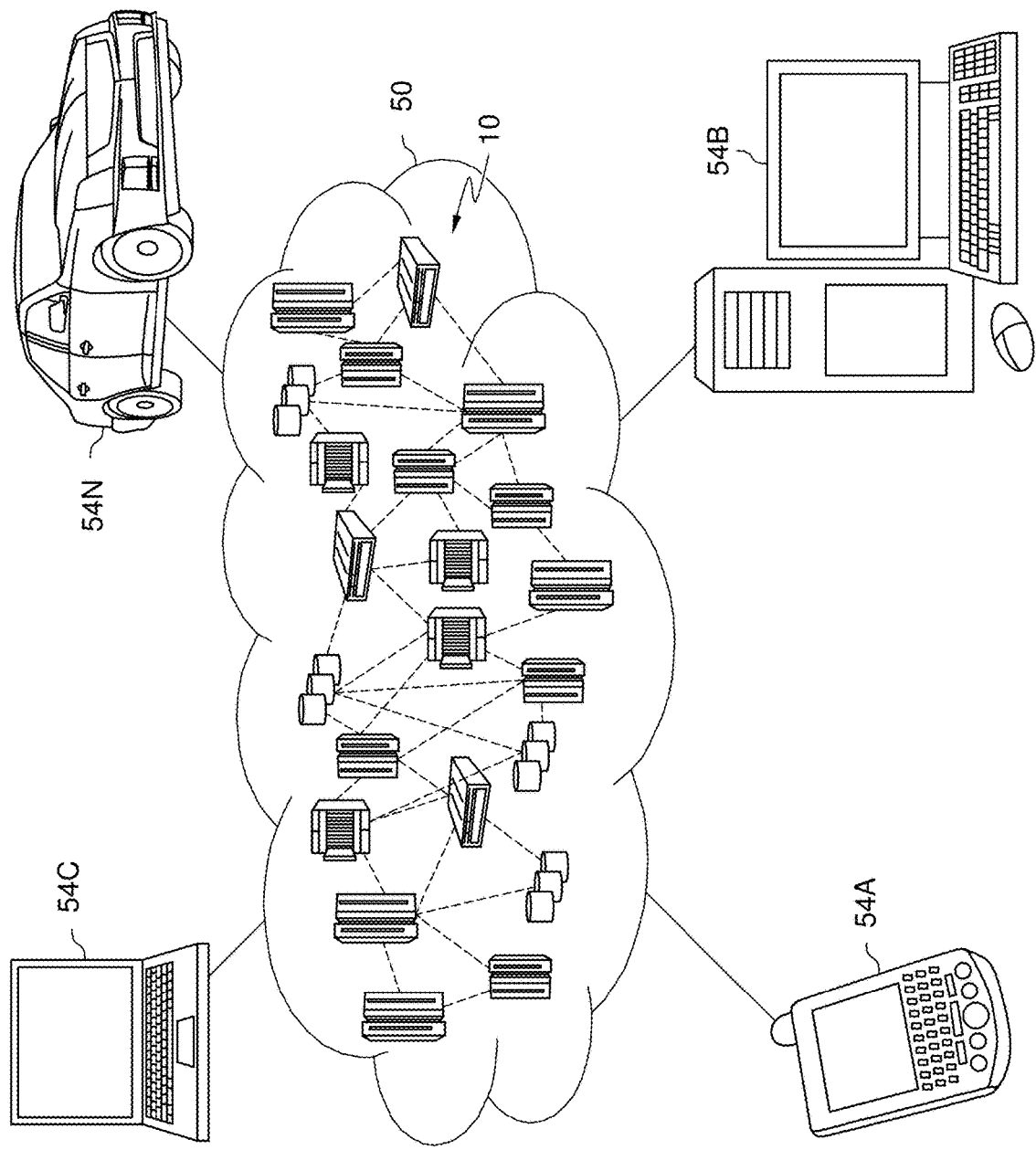
FIG. 9 is a diagram illustrating a cloud computing environment, in accordance with embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
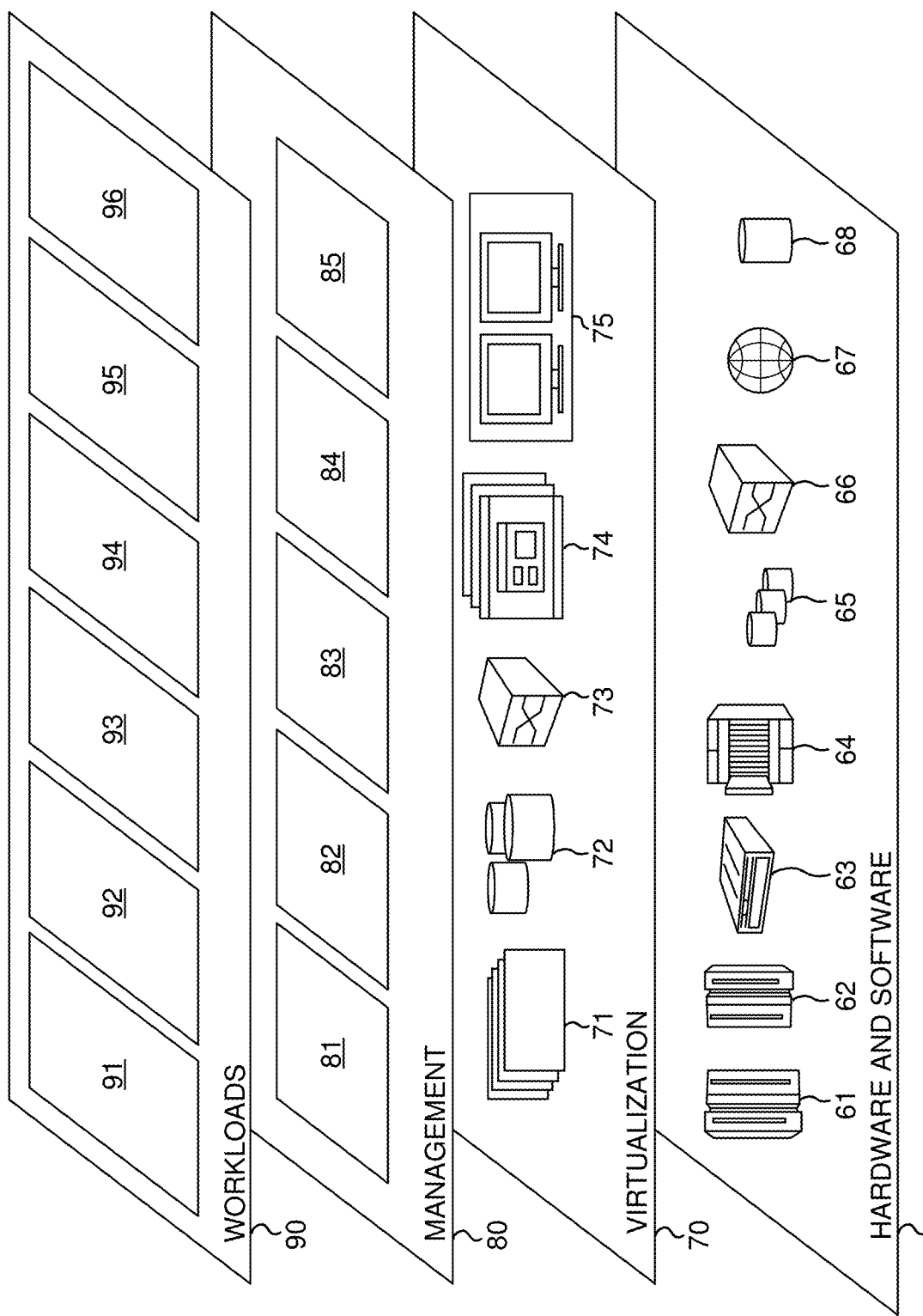
FIG. 10 is a block diagram illustrating abstraction model layers, in accordance with embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and support content management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    training a machine learning classification model to classify software feature identifications that correspond to issue descriptions by:
        receiving a set of historical issue descriptions;
        receiving a set of corresponding software feature identifications, each software feature identification mapped to a historical issue description within the set of historical issue descriptions; and
        training the machine learning classification model to predict future software feature identifications that correspond to newly received issue descriptions using a set of mappings between each historical issue description of the set of historical issue descriptions and each corresponding software feature identification of the set of corresponding software feature identifications as inputs;
    receiving an issue description from a user;
    identifying a software feature identification associated with the issue description using the trained machine learning classification model;
    obtaining a base image associated with the software feature identification;
    generating support content by modifying the base image to add information indicated in the issue description; and
    transmitting the generated support content.

2. The method of claim 1, further comprising, prior to modifying the base image, determining element types, element areas, and element values within the base image.

3. The method of claim 2, wherein the element types and the element areas are determined using an object detection algorithm.

4. The method of claim 2, wherein the element values are determined using optical character recognition (OCR).

5. The method of claim 2, wherein the element types and the element areas are used to add information into particular element areas within the generated support content.

6. The method of claim 2, further comprising, determining a relationship between two element types within the issue description using natural language processing, wherein the relationship is used to add information into the base image.

7. A system comprising:
    one or more processors; and
    one or more computer-readable storage media collectively storing program instructions which, when executed by the one or more processors, are configured to cause the one or more processors to perform a method comprising:
    training a machine learning classification model to classify software feature identifications that correspond to issue descriptions by:
        receiving a set of historical issue descriptions;
        receiving a set of corresponding software feature identifications, each software feature identification mapped to a historical issue description within the set of historical issue descriptions; and
        training the machine learning classification model to predict future software feature identifications that correspond to newly received issue descriptions using a set of mappings between each historical issue description of the set of historical issue descriptions and each corresponding software feature identification of the set of corresponding software feature identifications as inputs;
    receiving an issue description from a user;
    identifying a software feature identification associated with the issue description using the trained machine learning classification model;
    obtaining a base image associated with the software feature identification;

generating support content by modifying the base image to add information indicated in the issue description; and transmitting the generated support content.

8. The system of claim 7, further comprising, prior to modifying the base image, determining element types, element areas, and element values within the base image.

9. The system of claim 8, wherein the element types and the element areas are determined using an object detection algorithm.

10. The system of claim 8, wherein the element values are determined using optical character recognition (OCR).

11. The system of claim 8, wherein the element types and the element areas are used to add information into particular element areas within the issue description.

12. The system of claim 8, further comprising, determining a relationship between two element types within the issue description using natural language processing, wherein the relationship is used to add information into the base image.

13. The system of claim 8, wherein the generated support content is transmitted to support personnel to aid the user in resolving their issue associated with the issue description.

14. A computer program product comprising one or more computer readable storage media, and program instructions collectively stored on the one or more computer readable storage media, the program instructions comprising instructions configured to cause one or more processors to perform a method comprising:

training a machine learning classification model to classify software feature identifications that correspond to issue descriptions by:

receiving a set of historical issue descriptions;

receiving a set of corresponding software feature identifications, each software feature identification mapped to a historical issue description within the set of historical issue descriptions; and training the machine learning classification model to predict future software feature identifications that correspond to newly received issue descriptions using a set of mappings between each historical issue description of the set of historical issue descriptions and each corresponding software feature identification of the set of corresponding software feature identifications as inputs;

receiving an issue description from a user;

identifying a software feature identification associated with the issue description using the trained machine learning classification model;

obtaining a base image associated with the software feature identification;

generating support content by modifying the base image to add information indicated in the issue description; and transmitting the generated support content.

15. The computer program product of claim 14, further comprising, prior to modifying the base image, determining element types, element areas, and element values within the base image.

16. The computer program product of claim 15, wherein the element types and the element areas are determined using an object detection algorithm.

17. The computer program product of claim 15, wherein the element values are determined using optical character recognition (OCR).

18. The computer program product of claim 15, wherein the element types and the element areas are used to add information into particular element areas within the issue description.

19. The computer program product of claim 15, further comprising, determining a relationship between two element types within the issue description using natural language processing, wherein the relationship is used to add information into the base image.

\* \* \* \* \*